(12) United States Patent
Jeong

(10) Patent No.: US 10,118,116 B2
(45) Date of Patent: Nov. 6, 2018

(54) MOISTURE SEPARATOR AND AIR CYCLE SYSTEM WITH THE SAME

(71) Applicant: Hyun-Wook Jeong, Kimhae (KR)

(72) Inventor: Hyun-Wook Jeong, Kimhae (KR)

(*) Notice: Subject to any disclaimer, the term of this patent is extended or adjusted under 35 U.S.C. 154(b) by 232 days.

(21) Appl. No.: 14/988,859

(22) Filed: Jan. 6, 2016

(65) Prior Publication Data

US 2016/0193558 A1 Jul. 7, 2016

Related U.S. Application Data

(60) Provisional application No. 62/100,506, filed on Jan. 7, 2015.

(51) Int. Cl.

| | |
|---|---|
| *F24F 12/00* | (2006.01) |
| *B01D 46/00* | (2006.01) |
| *F24F 3/14* | (2006.01) |
| *F02C 3/00* | (2006.01) |
| *F02C 6/00* | (2006.01) |
| *F25B 9/00* | (2006.01) |

(52) U.S. Cl.
CPC ....... *B01D 46/0023* (2013.01); *B01D 46/003* (2013.01); *F02C 3/00* (2013.01); *F02C 6/00* (2013.01); *F24F 3/14* (2013.01); *F24F 12/001* (2013.01); *F25B 9/004* (2013.01); *F05D 2260/608* (2013.01); *F24F 2003/144* (2013.01)

(58) Field of Classification Search
CPC .......... B64D 2013/0651; F25B 9/004
See application file for complete search history.

(56) References Cited

U.S. PATENT DOCUMENTS

| | | | | | |
|---|---|---|---|---|---|
| 2,835,340 | A | * | 5/1958 | McGuff | B64D 13/00 55/482 |
| 3,105,631 | A | * | 10/1963 | Hanny | F01D 25/22 384/107 |
| 3,873,472 | A | * | 3/1975 | Oshima | B01D 53/945 423/213.5 |
| 4,078,965 | A | * | 3/1978 | Berger, Jr. | B01D 17/045 162/156 |
| 4,829,775 | A | * | 5/1989 | Defrancesco | B64D 13/06 62/402 |
| 2005/0051503 | A1 | | 3/2005 | Holland | |

FOREIGN PATENT DOCUMENTS

| | | |
|---|---|---|
| JP | 2001-509581 | 7/2001 |
| KR | 20-0307290 | 4/2003 |
| KR | 10-0827484 | 5/2008 |

* cited by examiner

*Primary Examiner* — Cassey D Bauer
(74) *Attorney, Agent, or Firm* — Lex IP Meister, PLLC

(57) ABSTRACT

The present invention provides a moisture separator separating condensed water mist in compressed air, and an air cycle system provided with the same. The moisture separator includes a coalescer filter and a wire mesh pad demister. The coalescer filter is provided with a filter media formed of a fiber layer through which compressed air is passed, primarily condensing moisture mist in the compressed air, and filtering foreign particles and a housing supporting the filter media. The wire mesh pad demister is provided at a downstream of the coalescer filter to receive the compressed air passed through the coalescer filter and secondarily condenses moisture mist in the compressed air to separate moisture using gravity.

17 Claims, 5 Drawing Sheets

MOISTURE SEPARATOR AND AIR CYCLE SYSTEM WITH THE SAME

CROSS-REFERENCE TO RELATED APPLICATION

This application claims priority to and the benefit of U.S. Patent Application No. 62/100,506 filed in the USPTO on Jan. 7, 2015, the entire contents of which are incorporated herein by reference.

BACKGROUND OF THE INVENTION (a) Field of the Invention

The present invention relates to a moisture separator that separates condensed water mist contained in compressed air, and an air cycle system provided with the same.

(b) Description of the Related Art

In order to separate moisture mist of minute particles existing in compressed air, an inertial filter utilizing cyclone, a swirl tube, and the like, a chevron demister, or a wire mesh pad demister may be used.

The inertial filter condenses and separates moisture in the air using a centrifugal force generated from a cyclone or a swirl vane, and generally used when a fluid flows with high-pressure and high-speed while causing a relatively large amount of pressure loss. The chevron demister condenses moisture while passing air by layering a plurality of vanes that are bent several times with a constant angle and separate the condensed moisture using gravity, but micro particle sized mist cannot be filtered. In case of the wire mesh pad demister, micro particle can be collected with a small pressure different at a low speed flow, but micro mist of 0.5 μm or less cannot be collected.

Further, in a conventional air cycle system, a coalescer is provided at a front end of an inertial filter to condense mist in the air and then the condensed mist is passed through the inertial filter such that efficiency of the filter can be increased. However, in this case also has a problem of causing a loss of pressure and micro particle moisture mist cannot be effectively filtered at low pressure condition.

Meanwhile, an air cycle system adopting a system mechanism which called a reverse baryton cycle refers to a system that enables heat exchange between compressed air and outside air to decrease a temperature of the compressed air and cooling effect can be acquired by expanding the temperature-decreased compressed air through an expansion turbine.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a moisture separator using a wire mesh pad demister, which can effectively remove condensed water mist included in compressed air by increasing the size of condensed water mist flown into the wire mesh pad demister for efficiency collection of the condensed water mist in the wire mesh pad demister, and an air cycle system using the same.

A moisture separator according to an exemplary embodiment of the present invention separates condensed water mist in compressed air, and includes a coalescer filter and a wire mesh pad demister. The coalescer filter is provided with a filter media formed of a fiber layer through which compressed air is passed, primarily condensing moisture mist in the compressed air, and filtering foreign particles and a housing supporting the filter media. The wire mesh pad demister is provided at a downstream of the coalescer filter to receive the compressed air passed through the coalescer filter and secondarily condenses moisture mist in the compressed air to separate moisture using gravity.

The media filter may be formed of one or more layers of fiber of which the surface has water repellency. The housing may support the interior surface and the exterior surface of the filter medial, and may be formed of one of porous plate and a wire mesh net.

The filter media may have a pore diameter of 10 μm or less. The wire mesh pad demister may be provided above the coalescer filter. The wire mesh pad demister may be provided above the coalescer filter, and may have a space ratio of 90% or more and the surface area of 700 $m^2/m^3$ or more.

An air cycle system according to an exemplary embodiment of the present invention includes an outside air heat exchanger and a moisture separator having the above-stated configuration. The outside air heat exchanger decreases a temperature of compressed air by heat-exchanging externally supplied high-temperature compressed air with outside air. The turbine rotates by receiving compressed air discharged from the outside air heat exchanger, and rapidly decreases a temperature and a pressure of the compressed air by passing the compressed air through a turbine blade and expanding the compressed air passed through the turbine blade. The moisture separator receives compressed air discharged from the turbine and generates dry cool air by removing moisture mist in the compressed air.

An inertial high-pressure air condensed water separator may be provided between the outside air heat exchanger and the turbine to separate condensed water in the compressed water. The condensed water separated by the high-pressure air condensed water separator is sprayed to an outside air inlet of the outside air heat exchanger to exchange sensible heat and latent heat with the compressed air.

a fan is coaxially combined to the turbine to intake outside air, and the turbine and the fan may be combined to a turbine assembly housing. The condensed water separated by the moisture separator may be supplied to a cooling circuit of the turbine assembly housing to cool the turbine assembly housing and then sprayed to the outside air inlet of the outside air heat exchanger to exchange sensible heat and latent heat with the compressed air.

A fan discharge air heat exchanger through which dry cool air is passed may be provided at a downstream of the moisture separator. High-temperature outside air discharged from the fan may be discharged to the outside through a discharge temperature control valve, which is a three-way valve, or may be injected to the fan discharge air heat exchanger for heat-exchange with the dry cool air.

The dry cool air passed through the fan discharge air heat exchanger may be supplied to a final use place after passing through a flow control valve and a flowmeter. When the dry cool air needs to be heated to a high temperature that exceeds the capacity of the fan discharge air heat exchanger, high-temperature compressed air supplied from the outside may be joined to a line between the fan discharge air heat exchanger and the flow control valve using a heat control valve to additionally increase the temperature of the dry cool air.

A de-icing control valve may be provided between the turbine and an external compressed air supply source. The de-icing control valve may bypass a part of the compressed air before the compressed air flows into the outside air heat exchanger to directly supply the compressed air to the turbine such that a temperature of the compressed air after passed through the turbine can be controlled not to be fall below zero.

A de-icing sensor may be provided between the turbine and the moisture separator to sense a temperature of the compressed air discharged from the turbine. When a temperature sensed by the de-icing temperature sensor is above zero, the de-icing control valve is closed, and when the sensed temperature is below zero, the de-icing control valve is opened and thus a high-temperature compressed air may be directly supplied to the turbine such that a temperature of air discharged from the turbine can be maintained close to 0° C.

A turbine nozzle may be provided in an air inlet of the turbine, and a bypass control valve that interacts with the flow control valve may be provided between the turbine and the moisture separator. The amount of flow of final-discharged dry cool air may be controlled using the flow control valve and the bypass control valve.

The turbine nozzle may be a variable turbine nozzle of which an angle of a vane can be adjusted, and the turbine nozzle may operate together with the flow control valve and the bypass control valve to control the flow amount of final-discharged dry cool air.

A small generator may be coaxially combined to the turbine to generate electricity. Electricity generated from the small generator may be converted to a direct current by being transmitted to a power conversion and control device, and the direct current may be used as power for a control device. The control device may include a plurality of regulators for controlling valves.

The moisture separator according to the present invention and the air cycle system provided with the same can effectively remove micro particle sized moisture mist in compressed air while minimizing a loss of pressure, and the wire mesh pad demister can be semipermanently used, and the coalescer filter and the wire mesh pad demister can be prevented from freezing and also prevented from going moldy.

DETAILED DESCRIPTION OF THE EMBODIMENTS

Figure 1:
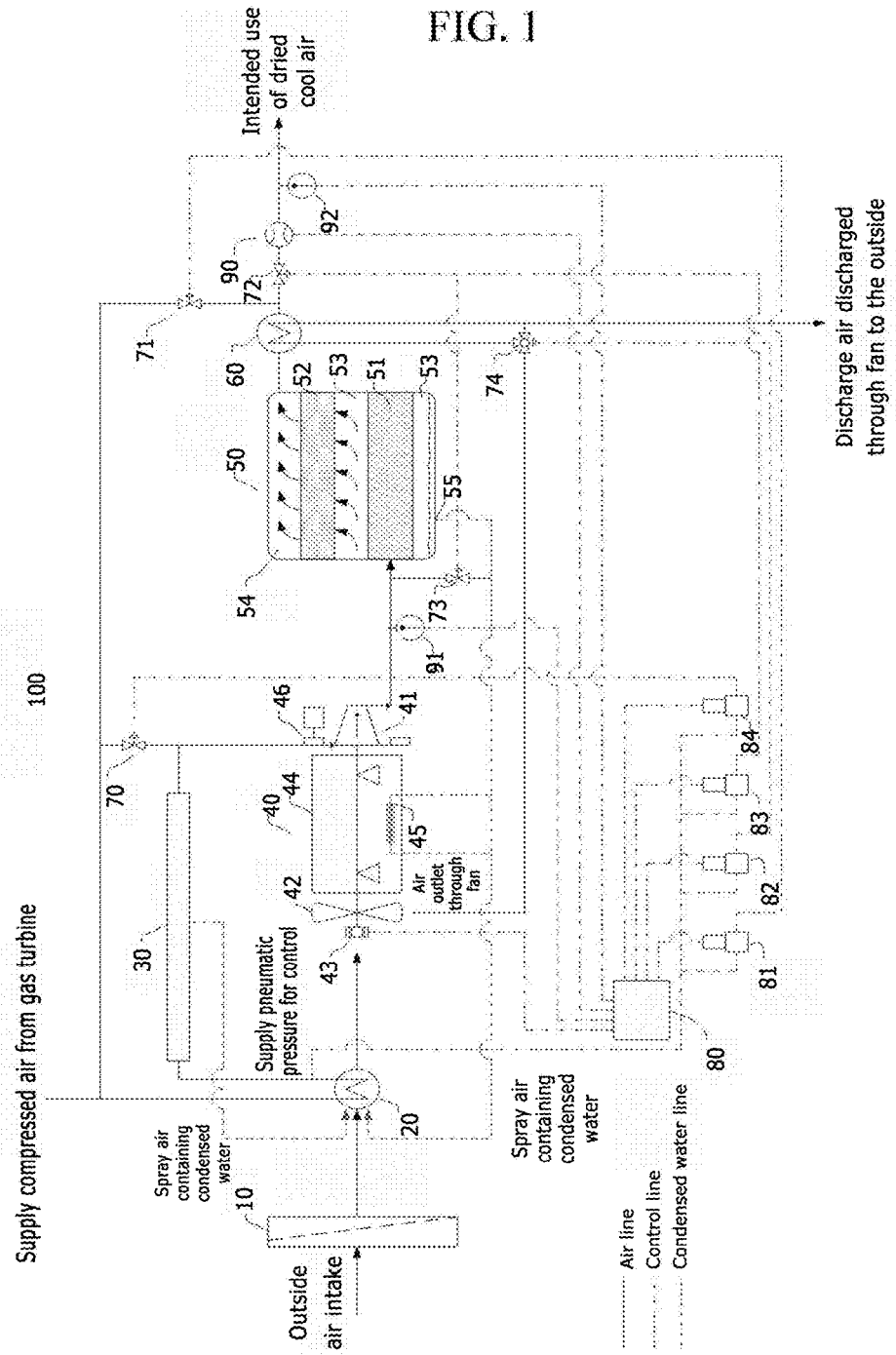
FIG. 1 is a diagram of an air cycle system according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A general air cycle system will now be described.

First, compressed air from the outside loses heat and then flows to a turbine, while passing through a heat exchanger with an outside air. When the turbine rotates by the compressed air, the compressed air flown into the turbine is cooled while being rapidly expanded and then discharged to a final intended use. A fan coaxially attached to the turbine that rotates by the compressed air rotates with a rotational force acquired from the turbine and intakes outside air such that the compressed air can be heat-exchanged with the outside air. Air passed through the heat exchanger by the fan is discharged back to the outside. In this case, the compressed air which has been heat-exchanged with the outside air may contain condensed water even through the amount of condensed water contained in the outside air may vary depending on the pressure of the compressed air, the amount of heat exchange, temperature and humidity of the outside air, and condensed water may be additionally generated from air cooled through the turbine due to a decreased temperature.

In case of a moisture separator of a general air cycle system, a coalescer bag provided in a downstream of a turbine condenses minute moisture from condensed water generated before air passed through the turbine or while the air passes through the turbine and water drop having large particles is removed by an inertial filter and the like. Such a process is advantageous in a simple structure and small space, but it also has a limit in condensation efficiency in the coalescer bag, and a pressure loss occurs when the condensation efficiency is increased for condensed water drop in the inertial filter.

A moisture separator of an air cycle system according to an exemplary embodiment of the present invention will be described with reference to FIG. 2A to FIG. 3B.

Referring to FIG. 2A to FIG. 3B, a moisture separator 50 is provided with an upper chamber 54 and a lower chamber 53, interposing a wire mesh pad demister 52 therebetween, and a coalescer-convertible filter 51 (hereinafter, referred to as a coalescer filter) is provided in the lower chamber 53 to allow air passed therethrough to flow into the wire mesh pad demister 52. Air containing condensed moisture cooled through a turbine 41 (refer to FIG. 1) first flows into the coalescer filter 51.

The coalescer filter 51 may have a cylindrical shape of which an air inlet (opening) 57 is provided in one side and the other side is surrounded by a filter media 56 such as non-woven fabric formed of a fiber film such polypropylene and the like. The fiber film used as the filter media 56 has a pore diameter of within 10 μm, and more preferably within 1 μm. Further, in order to minimize a loss of pressure, the thickness of the fiber layer is preferably equal to or less then 1 mm, and it may be single-layered or multi-layered. In case of using non-woven fabric of which water repellency treatment is applied to the surface of a fabric layer using silicon and the like, condensation efficiency can be more increased.

Figure 2A:
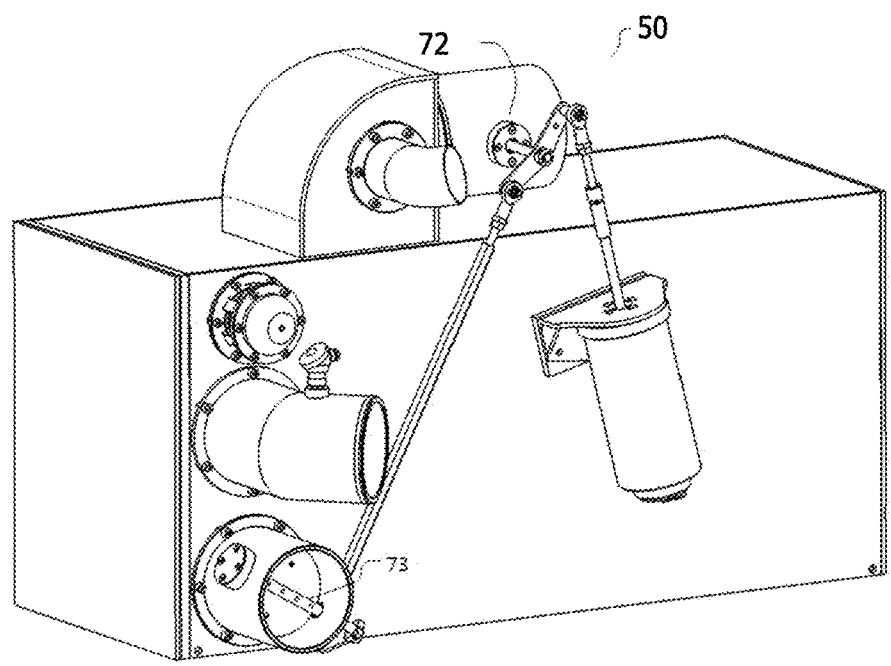
FIG. 2A and FIG. 2B are perspective views of a moisture separator according to an exemplary embodiment of the present invention.
Figure 2B:
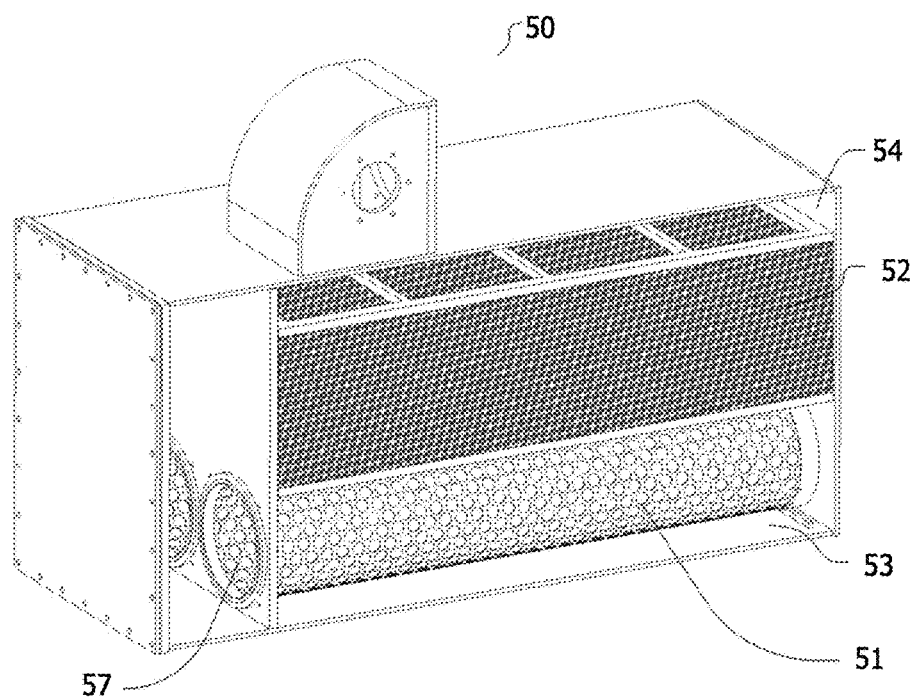
Figure 3A:
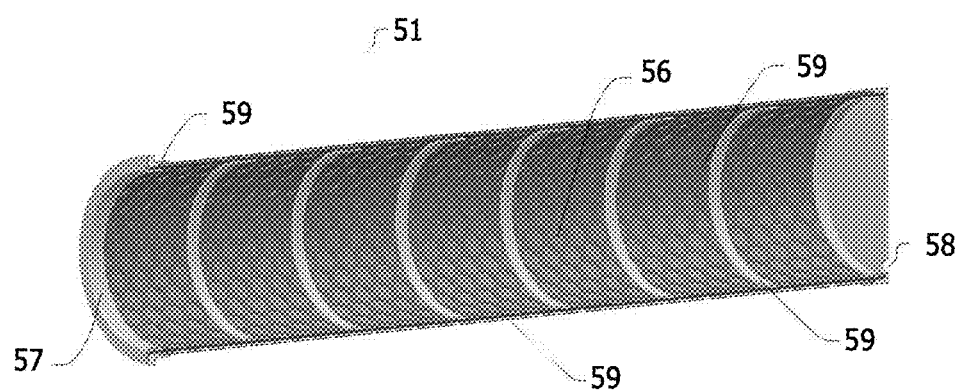
FIG. 3A is a partial cut-away perspective view of a coalescer of the moisture separator shown in FIG. 2B.
Figure 3B:
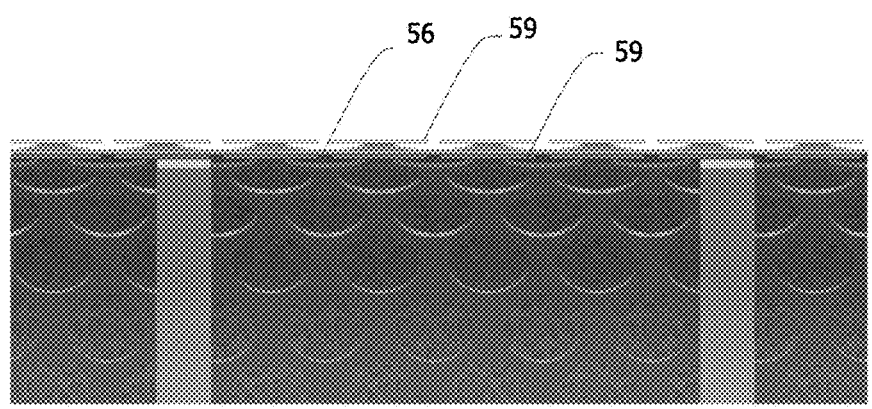
FIG. 3B is a partially enlarged view of the coalescer shown in FIG. 3A.

A housing formed of a punching plate and a wire mesh net may be provided to prevent deformation due to a pressure difference between the inside and the outside of the cylinder. For example, a double-layered housing 59 may be provided, interposing the filter media 56 therebetween to simultaneously support the inside and the outside of the cylinder. Further, in order to assure the area of filter media 56 to the maximum, a plurality of coalescer filters 51 may be provided side by side. In FIG. 2B, two coalescer filters 51 are exemplarily provided side by side in a horizontal direction.

The coalescer filter 51 may be provided with various shapes such as the cylindrical shape as shown in the drawing or a corrugated plate where filter media 56 are arranged in a zigzag format and the housing 59 is replaceable.

Air flown into the coalescer filter 51 is condensed into a minute water drop of about 0.5 to 0.5 μm in size while passing through the filter media 56. A part of water drops cannot pass through the filter media 56 and thus being collected in the filter media 56 and then discharged to the outside through a drain hole 58 provided in the ground surface in a gravitational direction. Air containing the minute water drops passed through the filter media 56 flows into the mesh pad demister 52 provided in an upper portion of the coalescer filter 51.

The wire mesh pad demister 52 is provided to condense the minute water drops of greater than or equal to 0.5 μm in size with high efficiency to an upper space without re-scattering of the water drops. For example, the wire mesh pad demister 52 may have a flow path of which a cross-section has 90% or more of space ratio, 700 $m^2/m^3$ or more of surface area, and 5 m/s or less of velocity, and in this case, the thickness of the wire mesh pad demister 52 may be set between 100 mm to 300 mm. Further, the wire mesh may be preferably made of a stainless wire and the like for durability.

The minute water drop, condensed into the size of 0.5 μm or more while passing through the coalescer filter 51 is condensed into a larger-sized water drop while moving upward from the bottom of the wire mesh pad demister 52 and then flows down due to gravity. Condensed water collected in the ground surface of the lower space of the wire mesh pad demister 52 is discharged to the outside through the drain hole 58.

When the moisture separator 50 is formed of only the mesh pad demister 52 without the coalescer filter 51, mist of 0.8 μm or less cannot be condensed, when a wire mesh pad demister made of a material such as polypropylene and having micro pores is used as the mesh pad demister 52, the moisture separator 50 may be clogged due to foreign particles and durability may be deteriorated when a hot wind is supplied for drying.

In the present exemplary embodiment, since the coalescer filter 51 filters foreign particles in the air flowing into the wire mesh pad demister 52, the wire mesh pad demister 52 can be semipermanently used.

The air cycle system 100 that adopts the above-sated moisture separator 50 will now be described with reference to FIG. 1.

First, compressed air supplied from the gas turbine passes through an air filter 10 and then is supplied to an outside air heat exchanger 20 such that the compressed air heat-ex-changes with the outside air. For example, the compressed air supplied from the gas turbine may have a gauge pressure of 3 bar and a temperature of 200° C.

An atmosphere temperature is set to be 25° C. and a relative humidity is set to be 80%, and a temperature of compressed air after the heat-exchange in the outside air heat-exchanger 20 is set to 40° C. without regard to capacity and efficiency of the heat-exchanger. In this case, since the compressed air supplied from the gas turbine also intakes and compresses the same outside air, a dew point of the compressed air becomes about 45° C. Since the temperature after the heat-exchange is decreased below the dew point, condensed water is generated. When the compressed air contains moisture of about 16 g per 1 kg of dry air, about 4 g of condensed water can be generated.

The condensed water is primarily separated while passing through a high-pressure air condensed water separator 30. The high-pressure air condensed water separator 30 can apply an inertial separator which is effective in high-pres-sure high-speed fluid. The separated condensed water is sprayed with partial air to the outside air inlet of the outside air heat exchanger 10 such that efficiency of the heat exchanger can be improved through sensible heat and latent heat exchange with the compressed air.

The compressed air of which the condensed water is primarily separated flows into the turbine 41 and then sprayed to a turbine blade with high speed through a turbine nozzle 46 such that the compared air is discharged while expanding the turbine 41 by rotating the turbine 41.

Pressure and temperature of the air expanded through the turbine 41 are rapidly decreased, for example, to a gauge pressure of 0.3 bar and a temperature of 0° C., but these may be changed depending on an efficiency of the turbine. A dew point of the air in the corresponding pressure and accordingly condensed water is generated, and in this case, the amount of condensed water may be about 9 g. In this case, the generated condensed water exists as mist of about within 1 μm, and therefore a moisture separator that can effectively remove micro-particle sized moisture.

As described above, the air passed through the turbine 41 flows into the moisture separator 50 and then passes through the cylindrical-shaped filter media 56 through openings 57 of two coalescer filters 51. In this case, large-particle sized moisture cannot pass through the filter media 56 due to water repellency of the filter media 56 and thus is collected in the bottom of the cylindrical filter media and then discharged to the outside through the drain hole 58.

The moisture mist and air passed through the coalescer filter 51 flow into the wire mesh pad demister 52 and then are condensed into a large-sized water drop while moving upward, and then the water drops are dropped to the ground of the lower chamber 53 and then discharged through a moisture outlet 55.

The condensed water discharged with partial air is partially or wholly supplied to a cooling circuit 45 of the turbine assembly housing 44 and cools a bearing or lubricating oil, and then is sprayed to an outside air inlet of the outside air heat exchanger 20 to thereby improve efficiency of the heat exchanger through sensible heat and latent heat exchange. Dry cool air of which most condensed water mist are filtered while passing through the wire mesh pad demister 52 is supplied to a fan discharge air heat exchanger 60 through the upper chamber 54.

Meanwhile, a fan 42 coaxially assembled with the turbine 41 and thus rotates by power of the turbine 41 enables high-temperature outside air to flow into the outside air heat exchanger 20 from the outside and the high-temperature outside heat-exchanged with the compressed air may be discharged to the outside through a discharge temperature control valve 74, which is a three-way valve, or may be discharged after passing through a fan discharge air heat exchanger 60.

Thus, dry cool air flown into the fan discharge air heat exchanger 60 and the high-temperature fan-discharged air may exchange heat, and accordingly, the temperature of the dry cool air can be increased and relative humidity can be further decreased. A discharge temperature sensor 92 senses a temperature of the final-discharged dry cool air and controls the amount of air distribution for each line of the discharge temperature control valve 74 so as to adjust a desired temperature of a power conversion and control device 80.

The dry cool air passed through the fan discharge air heat exchanger 60 is supplied to a final use place through a flow control valve 72 and a flowmeter 90. In this case, various flowmeters such as an orifice flowmeter or a venture flow-meter may be used as the flowmeter 90.

Meanwhile, a temperature of air discharged from the turbine 41 may fall down below zero, and thus a device that can prevent freezing of the outlet of the turbine 41 and freezing of the coalescer filter 51 and the wire mesh pad demister 52 is required.

For this, a de-icing control valve 70 that can bypass a part of the compressed air before the air flows into the outside air heat exchanger 20 to thereby prevent the temperature of the cooled air after passed through the turbine 41 from falling down below zero by supplying the bypassed air to the turbine 41. When a de-icing temperature sensor 91 senses that the temperature of the air discharged from the turbine 41 is over 0° C., the de-icing control valve 70 is closed, and when the temperature falls close to 0° C., the de-icing control valve 70 is opened such that the high-temperature compressed air is supplied to the turbine 41 rather than passing through the outside air heat exchanger 20, thereby increasing the temperature of the air discharged from the turbine 41

Particularly, in order to increase moisture elimination efficiency of the moisture separator 50, much more condensed water needs to be generated by maintaining the temperature of air discharged from the turbine 41 as low as possible but above the freezing point. Thus, the de-icing control valve 70 needs precise control so as to maintain the temperature of air discharged from the turbine 41 close to above zero, which is closest to 0° C.

The air cycle system 100 of the present exemplary embodiment can provide prompt and precise control such that air discharged from the turbine 41 from starting of the air cycle system 100 can be prevented from instantaneously dropping to zero to thereby prevent freezing through a combination of a small-sized generator, an electronic temperature sensor, a diaphragm pneumatic valve, and an electro pneumatic regulator.

As previously stated, the dry cool air passed through the moisture separator 50 may be increased in temperature through the fan discharge air heat exchanger 60 as necessary, and when the temperature of the dry cool air needs to be supplied to a final use place after being heated to a high temperature that exceeds capacity of the fan discharge air heat exchanger 60, the temperature of the dry cool air can be further increased by joining the high-temperature air to a line between the fan discharge air heat exchanger 60 and the flow control valve 72 using a heat control valve 71.

The air cycle system 100 of the present exemplary embodiment can control the amount of flow by adjusting a cross-section of a flow path that passes through the turbine nozzle by applying a variable turbine nozzle that can change a vane angle of the turbine nozzle 46. Alternatively, a static turbine nozzle is used and the flow control valve 72 and a bypass control valve 73 that interacts with the flow control valve 72 are simultaneously controlled such that the amount of flow of final-discharged dry cool air, or the amount of flow can be promptly controlled while increasing nozzle efficiency by simultaneously using the variable turbine nozzle 46, the flow control valve 72, and the bypass control valve 73.

For example, the air bypassed through the bypass control valve 73 may be joined to a line of condensed water discharged from the moisture separator 50, and the bypassed air and the condensed water may be used to cool the turbine assembly housing 44 or may be directly sprayed to the outside air inlet of the outside air heat exchanger 20.

In general, the air cycle system is independent equipment, and adopts a pneumatic control method and thus being supplied with compressed air rather than being supplied with power. However, the pneumatic control method has a problem of inaccuracy in sensing of a temperature and malfunctioning in flow control, and cannot implement an automatic temperature control function.

In the air cycle system 100 of the present exemplary embodiment, a small-sized generator 43 is provided in a rotation shaft of the turbine assembly 40 such that electricity can be generated when the turbine 41 rotates. The generator 43 is preferably as small as less than 100 W in order not to waste turbine power. Electricity generated from the generator 43 is supplied to the power conversion and control device 80 and then converted to a DC so as to be used power supply for each control device.

In order to control the entire system with a small amount of electricity, it is preferably to drive a valve that consumes relatively a large amount of power with a small amount electricity by combining an electro pneumatic regulator and a diaphragm pneumatic valve by utilizing compressed air of the system rather than using a valve to which an electric actuator is attached.

That is, it is preferably that the de-icing control valve 70, the heat control valve 71, the flow control valve 72, the bypass control valve 73, and the discharge temperature control valve 74 are respectively formed of diaphragm pneumatic valves driven by compressed air and a heat control valve adjusting regulator 82, a regulator for adjusting the flow control valve and the bypass control valve, and a regulator 84 for the de-icing control valve are respectively formed of electro pneumatic regulators.

Meanwhile, the coalescer filters 51 and the wire mesh pad demister 52 applied to the moisture separator 50 in the present exemplary embodiment may be frozen due to residual moisture when being stored after stop oprating. Thus, the following method is used to dry the residual moisture after the air cycle system 100 stop operating.

When the system is order to be stopped, the flow control valve 72 is completely closed to stop the dry cool air supplied to a use place, and stopped and the bypass control valve 73 is opened to bypass the air. In this case, when high-temperature compressed air is supplied by opening the heat control valve 71, the high-temperature compressed air is passed through the wire mesh pad demister 52 and the coalescer filter 51 in a reverse direction of the normal flow direction through the upper chamber 54 of the moisture separator 50 and then discharged to the outside through the bypass control valve 73 thereby drying the inside of the air cycle system 100.

Alternatively, the bypass control valve 73 is provided in the very previous stage of the flow control valve 72, and increases a temperature of air discharged from the turbine by opening the de-icing control valve 70 while the flow control valve 72 is closed and the bypass control valve 73 is opened and then the high-temperature air is bypassed through the moisture separator 50 such that the inside of the air cycle system 100 can be dried. Thus, after the system 100 stops operating, moisture in the system 100 can be removed when the system 100 is stored such that the system 100 can be prevented from freezing and can be prevented from going moldy.

Further, when the atmosphere condition is below zero and the system 100 is started after being stored, high-temperature air is supplied along the normal flow direction or a reverse direction using the above-stated two methods and thus the system 100 can normally operate by being quickly melt even through it is frozen inside.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A moisture separator separating condensed water mist in compressed air, comprising:
   a coalescer filter provided with a filter media formed of a fiber layer through which compressed air is passed, primarily condensing moisture mist in the compressed air, and filtering foreign particles and a housing supporting the filter media; and
   a wire mesh pad demister provided at a downstream of the coalescer filter to receive the compressed air passed through the coalescer filter and secondarily condensing moisture mist in the compressed air to separate moisture using gravity,
   wherein a drain hole is provided in the ground surface of the coalescer filter in a gravitational direction, through which water drops collected in the filter media are discharged to the outside, and
   the housing supports the interior surface and the exterior surface of the filter media and is formed of porous plate.

2. The moisture separator of claim 1, wherein the media filter is formed of one or more layers of fiber of which the surface has water repellency.

3. The moisture separator of claim 2, wherein the filter media has a pore diameter of 10 μm or less.

4. The moisture separator of claim 1, wherein the wire mesh pad demister is provided above the coalescer filter.

5. The moisture separator of claim 1, wherein the wire mesh pad demister is formed of a metal wire, and has a space ratio of 90% or more and the surface area of $700m^2/m^3$ or more.

6. An air cycle system comprising;
   an outside air heat exchanger decreasing a temperature of compressed air by heat-exchanging externally supplied high-temperature compressed air with outside air;
   a turbine rotating by receiving compressed air discharged from the outside air heat exchanger, and rapidly decreasing a temperature and a pressure of the compressed air by passing the compressed air through a turbine blade and expanding the compressed air passed through the turbine blade; and
   a moisture separator receiving compressed air discharged from the turbine and generating dry cool air by eliminating moisture mist in the compressed air,
   wherein the moisture separator includes:
   a coalescer filter provided with a filter media formed of a fiber layer through which the compressed air discharged from the turbine is passed, primarily condensing moisture mist in the compressed air, and filtering foreign particles and a housing supporting the filter media,
   a wire mesh pad demister provided at a downstream of the coalescer filter to receive the compressed air passed through the coalescer filter and secondarily condensing moisture mist in the compressed air to separate moisture using gravity, and
   a fan is coaxially combined to the turbine to intake outside air, the turbine and the fan are combined to a turbine assembly housing, and the condensed water separated by the moisture separator is supplied to a cooling circuit of the turbine assembly housing to cool the turbine assembly housing and then sprayed to the outside air inlet of the outside air heat exchanger to exchange sensible heat and latent heat with the compressed air.

7. The air cycle system of claim 6, wherein an inertial high-pressure air condensed water separator is provided between the outside air heat exchanger and the turbine to separate condensed water in the compressed air and the condensed water separated by the high-pressure air condensed water separator is sprayed to an outside air inlet of the outside air heat exchanger to exchange sensible heat and latent heat with the compressed air.

8. The air cycle system of claim 6, wherein a fan discharge air heat exchanger through which dry cool air is passed is provided at a downstream of the moisture separator, and high-temperature outside air discharged from the fan is discharged to the outside through a discharge temperature control valve, which is a three-way valve, or injected to the fan discharge air heat exchanger for heat-exchange with the dry cool air.

9. The air cycle system of claim 8, wherein the dry cool air passed through the fan discharge air heat exchanger is supplied to a final use place after passing through a flow control valve and a flowmeter, and
   when the dry cool air needs to be heated to a high temperature that exceeds the capacity of the fan discharge air heat exchanger, high-temperature compressed air supplied from the outside is joined to a line between the fan discharge air heat exchanger and the flow control valve using a heat control valve to additionally increase the temperature of the dry cool air.

10. An air cycle system comprising;
    an outside air heat exchanger decreasing a temperature of compressed air by heat-exchanging externally supplied high-temperature compressed air with outside air;
    a turbine rotating by receiving compressed air discharged from the outside air heat exchanger, and rapidly decreasing a temperature and a pressure of the compressed air by passing the compressed air through a turbine blade and expanding the compressed air passed through the turbine blade; and
    a moisture separator receiving compressed air discharged from the turbine and generating dry cool air by eliminating moisture mist in the compressed air,
    wherein the moisture separator includes:
    a coalescer filter provided with a filter media formed of a fiber layer through which the compressed air discharged from the turbine is passed, primarily condensing moisture mist in the compressed air, and filtering foreign particles and a housing supporting the filter media,
    a wire mesh pad demister provided at a downstream of the coalesce filter to receive the compressed air passed through the coalesce filter and secondarily condensing moisture mist in the compressed air to separate moisture using gravity, and
    a de-icing control valve provided between the turbine and an external compressed air supply source,
    the de-icing control valve bypassing a part of the compressed air before the compressed air flows into the outside air heat exchanger to directly supply the compressed air to the turbine such that a temperature of the compressed air after passed through the turbine can be controlled not to fall below zero.

11. The air cycle system of claim 10, wherein a de-icing sensor is provided between the turbine and the moisture separator to sense a temperature of the compressed air discharged from the turbine, and when a temperature sensed by the de-icing temperature sensor is above zero, the de-icing control valve is closed, and when the sensed temperature is below zero, the de-icing control valve is opened and thus a high-temperature compressed air is directly supplied to the turbine such that a temperature of air discharged from the turbine can be maintained close to 0° C.

12. The air cycle system of claim 9, wherein a turbine nozzle is provided in an air inlet of the turbine, a bypass control valve that interacts with the flow control valve is provided between the turbine and the moisture separator, and the amount of flow of final-discharged dry cool air is controlled using the flow control valve and the bypass control valve.

13. The air cycle system of claim 12, wherein the turbine nozzle is a variable turbine nozzle of which an angle of a vane can be adjusted, and the turbine nozzle operates together with the flow control valve and the bypass control valve to control the flow amount of final-discharged dry cool air.

14. The air cycle system of claim 6, wherein a small generator is coaxially combined to the turbine to generate electricity, and electricity generated from the small generator is converted to a direct current by being transmitted to a power conversion and control device, and the direct current is used as power for the control device.

15. The air cycle system of claim 14, wherein the control device comprises a plurality of regulators for controlling valves.

16. The air cycle system of claim 10, wherein a small generator is coaxially combined to the turbine to generate electricity, and electricity generated from the small generator is converted to a direct current by being transmitted to a power conversion and control device, and the direct current is used as power for the control device.

17. The air cycle system of claim 16, wherein the control device comprises a plurality of regulators for controlling valves.

* * * * *